United States Patent [19]

Münster

[11] 4,203,959
[45] May 20, 1980

[54] PROCESS FOR THE PREPARATION OF NITROUS OXIDE

[75] Inventor: Gerhard Münster, Bad Soden am Taunus, Fed. Rep. of Germany

[73] Assignee: Hoechst Aktiengesellschaft, Frankfurt am Main, Fed. Rep. of Germany

[21] Appl. No.: 20,040

[22] Filed: Mar. 13, 1979

[30] Foreign Application Priority Data

Mar. 15, 1978 [DE] Fed. Rep. of Germany ....... 2811181

[51] Int. Cl.$^2$ ............................................. C01B 21/22
[52] U.S. Cl. ................................................... 423/400
[58] Field of Search ................ 423/388, 400, 242, 235

[56] References Cited

U.S. PATENT DOCUMENTS 1,010,177  11/1911  Raschig ................................. 423/388

OTHER PUBLICATIONS

Johnston et al., "J.A.C.S.," vol. 56; Mar. 1934; p. 625.
Nyholm et al., Inorg. Synthesis, vol. V, McGraw Hill Book Co., N.Y., 1957, pp. 117–122.
Partington; A Textbook of Inorg. Chem., 6 ed., McMillan & Co., London, 1950, p. 547.
Brauer, Handbook of Prep. Inorg. Chem., vol. 1, 2nd ed., Academic Press, N. Y., 1963, pp. 484–485.

Primary Examiner—G. O. Peters
Attorney, Agent, or Firm—Curtis, Morris & Safford

[57] ABSTRACT

When adding simultaneously nitrite and sulfite in a molar ratio of from 1:1 to 1:1.5 to an acid aqueous solution having a pH value of from 0 to 3, nitrous oxide is formed. The process is carried out at a temperature in the range of from 0° to 100° C. Instead of sulfite there may also be used $SO_2$. The gaseous nitrous oxide formed can be freed from impurities ($SO_2$, NO) by washing with aqueous alkali metal hydroxide solution and alkaline permanganate solution.

5 Claims, No Drawings

PROCESS FOR THE PREPARATION OF NITROUS OXIDE

The present invention relates to a process for the preparation of nitrous oxide from nitrite and sulfite.

The preparation of nitrous oxide is effected in industry almost exclusively by the thermal decomposition of ammonium nitrate (Ullmann, Enzyklopädie der technischen Chemie, 1964, 3rd edition, volume 15, page 44). In this process there are usually applied temperatures of more than 100° C., in most cases from 200° to 300° C. If the reaction is not carried out in aqueous solutions, there is the risk of an uncontrolled decomposition of the ammonium nitrate which has the properties of an explosive, as is well known. Nevertheless this process has been established as the only one in industry so far and may be conducted almost without risk if special precautions are taken.

The subject of the present invention is a process for the preparation of nitrous oxide, which comprises adding an inorganic nitrite and an inorganic $SO_2$ source to an aqueous solution having a pH value of from 0 to 3, while adjusting a molar ratio of the nitrite to the sulfite of from 1:1 to 1:1.5.

As inorganic nitrites there are suitable, for example, magnesium nitrite, but especially alkali metal nitrites, preferably sodium nitrite.

As inorganic $SO_2$ source there are suitable, for example, calcium sulfite, alkali metal sulfites and alkali metal bisulfites, especially sodium bisulfite. Although sulfites are equally appropriate as bisulfites, they show the drawback that they require a continuous addition of acid, in order to maintain the pH range of from 0 to 3.

When using sodium nitrite and sodium bisulfite, the process of the invention may be described by the following reaction equation:

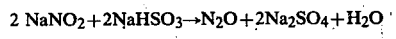

$$2\,NaNO_2 + 2\,NaHSO_3 \rightarrow N_2O + 2\,Na_2SO_4 + H_2O$$

In this case, concentrated solutions are suitably used as starting compounds (the content of nitrite and bisulfite being 40% by weight, for example); however, less concentrated solutions are also completely reacted in the corresponding molar ratio. The reaction temperatures are in the range of from 0° to 100° C., preferably from 30° to 60° C., especially from 40° to 50° C. Higher temperatures promote the formation of by-products, for example nitrogen oxide, whereas at lower temperatures the reaction develops too slowly, and the nitrite might not be reacted completely. There are preferably applied molar ratios of sulfite to nitrite of from 1.0 to 1.1. Higher excess amounts of bisulfite (for example a ratio of sulfite to nitrite of 1.5 or more) lead to a higher $SO_2$ content in the nitrous oxide with a simultaneous reduction of the NO content.

The process of the invention may be carried out within a wide pressure range, for example at a pressure of from 1 to 10 bars. When applying higher pressures, the nitrous oxide may be obtained already in a compressed form.

For adjusting the pH value in the range of from 0 to 3 there are suitable strong acids, such as hydrochloric acid and nitric acid, and preferably sulfuric acid. The reaction may be carried out discontinuously or preferably continuously. In the continuous operation the nitrite solution, the sulfite solution and the acid are fed into a reactor (stirring vessel, column) in the corresponding quantitative ratio. The heat of reaction is carried off by cooling. The nitrous oxide being formed contains about 50 to 90% of $N_2O$ and is still rendered impure by $N_2$, NO, $SO_2$ and water vapor. When technical sodium nitrite liquor (content of sodium carbonate of about 0.5%) is used, the gas being formed contains also $CO_2$. Said gas is freed in known manner from the above-mentioned gases by washing with sodium hydroxide solution and alkaline permanganate solution, and is subsequently dried. Nitrogen is eliminated by the rectification of the nitrous oxide liquefied under pressure.

As inorganic $SO_2$ source, sulfur dioxide itself is especially suitable. When using sodium nitrite, this variant may be described by the following reaction equation:

$$2\,NaNO_2 + 2\,SO_2 + H_2O \rightarrow N_2O + 2\,NaHSO_4$$

Use is preferably made of diluted or moderately concentrated sodium nitrite solutions of, for example, 5 to 20% by weight. With solutions of a higher concentration, solid sodium sulfate may temporarily be formed which produces undesirable side effects (stoppage of pipes). Besides, in this variant the proportion of nitrogen oxide formed as by-product is the greater the higher the concentration of the nitrite solution.

The sulfur dioxide is preferably used as a pure gas; however, it may also be introduced into the reaction mixture while being diluted with recycled nitrous oxide. Since the reaction is strongly exothermic and the heat being set free must be carried off by cooling, it may be advantageous to introduce the sulfur dioxide in a liquid form. When using sulfur dioxide, the reaction temperatures are preferably in the range of from 20° to 40° C. The molar ratio of nitrite to $SO_2$ should be about 1:1 corresponding to the reaction equation.

Also when using $SO_2$, the process may be carried out discontinuously, but preferably continuously. In the continuous operation, for example, sodium nitrite solution is fed into a stirring vessel into which $SO_2$ gas has been introduced, the heat of reaction being carried off by cooling. The escaping nitrous oxide is washed in the countercurrent over a column with the $NaNO_2$ solution fed in and is thus freed from $SO_2$. By measuring the redox potential in the reaction vessel, the supply of sodium nitrite solution in the reaction vessel may be regulated and an excess amount of nitrite can be avoided.

It is also possible to introduce the sodium nitrite solution at the top of a column and the $SO_2$ gas in the countercurrent at the bottom, in which process it has to be ensured by intensive cooling that the heat of reaction is carried off. In this countercurrent variant the thoroughly reacted solution may still contain dissolved sulfur dioxide as well as other nitrogen-containing reducing substances, such as hydroxylamine (about 1 to 3 molar %, calculated on the nitrite employed). However, with an appropriate performance of the reaction, the spent solution does generally not contain any nitrite nor bisulfite. When using sodium salts, it represents essentially an acid aqueous solution of sodium sulfate, from which Glauber's salt or anhydrous sodium sulfate may be obtained by way of crystallization in known manner.

The process is particularly economical in cases where as inorganic nitrite there are used the solutions which contain nitrate besides nitrite and which are obtained in the alkaline absorption of nitrose-containing waste gases. In the same manner it is possible to eliminate and utilize sodium bisulfite solutions which are obtained from sulfur dioxide-containing waste gases in the gas washing with sodium hydroxide solution. Nitrous oxide is used in anaesthesia as a narcotic. The following Examples serve to further illustrate the present invention.

EXAMPLE 1

As reaction vessel there was used a jacketed stirring vessel with a capacity of 2 liters provided with an overflow. By way of dosing pumps, 400 ml of a 7.77 molar sodium nitrite solution and 620 ml of a 5.13 molar sodium bisulfite solution (molar ratio of bisulfite to nitrite of 1.04) were fed into the vessel per hour. The pH value was maintained at 0.5 by the controlled addition of 3 molar sulfuric acid, for which purpose there were required about 400 ml of this acid per hour. The temperature in the reaction vessel was maintained at 40° C. by way of a jacket cooling with cooling water. There were obtained 42.8 l of steam-saturated nitrous oxide of 20° C. and 1.013 bars per hour. The spent solution was free of nitrite.

EXAMPLE 2

390 Milliliters of 7.77 molar technical $NaNO_2$ solution and 630 ml of 5.13 molar $NaHSO_3$ solution (molar ratio of bisulfite to nitrite of 1.06) were introduced gradually per hour into the same apparatus as in Example 1. The pH-value was adjusted to 0.9 by the controlled addition of about 200 ml/h of 3 molar sulfuric acid. The temperature was 40° C. Per hour, 37.1 l of nitrous oxide (moist; 20° C. and 1.013 bars) were produced. The dry gas had the following composition: $N_2O$ 90%; NO 7.6%; $CO_2$ 2.1%; $N_2$ 0.58%; $SO_2$ 0.1%. The spent solution was free of nitrite.

EXAMPLE 3

In the same apparatus as in Example 1, 400 ml of 7.77 molar $NaNO_2$ solution and 630 ml of 5.13 molar $NaHSO_3$ solution were reacted per hour at 40° C. (molar ratio of bisulfite to nitrite of 1.04). The pH value was adjusted to 1.9 by the controlled addition of about 90 ml/h of 3 molar sulfuric acid. Per hour, 43.7 l of nitrous oxide (moist; 20° C. and 1.013 bars) were developed. The spent solution still contained small amounts of nitrite.

EXAMPLE 4

In the same apparatus as in Example 1, 400 ml of 7.77 molar $NaNO_2$ solution and 620 ml of 5.13 molar $NaHSO_3$ solution were reacted per hour (molar ratio of bisulfite to nitrite of 1.02). The temperature was maintained at 80° C. by means of a thermostat. The pH value was adjusted to 1.1 by the controlled addition of about 230 ml/h of 3 molar sulfuric acid. The amount of gas which was developed per hour was 40.5 l (moist; 20° C. and 1.013 bars). The dry gas had the following composition: $N_2O$ 71%; NO 14%; $CO_2$ 1.7%; $N_2$ 4.7%; $SO_2$ 7.9%. The spent solution was free of nitrite.

EXAMPLE 5

In the same apparatus as in Example 1, 385 ml of a 7.77 molar sodium nitrite solution and 860 ml of a 5.13 molar sodium bisulfite solution were reacted per hour (molar ratio of bisulfite to nitrite of 1.48). The temperature was 40°, and the pH value was adjusted to 0.8 by the addition of about 260 ml/h of 3 molar sulfuric acid. There were developed 33.7 l of nitrous oxide per hour (moist; 20° C. and 1.013 bars). The dry gas showed the following composition: $N_2O$ 84%; NO 2.0%; $CO_2$ 2.2%; $N_2$ 2.0%; $SO_2$ 9.1%. The spent solution was free of nitrite.

EXAMPLE 6

In the apparatus according to Example 1 there were reacted per hour 400 ml of a 7.77 molar sodium nitrite solution and 885 ml of a 5.13 molar sodium bisulfite solution (molar ratio of bisulfite to nitrite of 1.46). The temperature was 40° C., and the pH value was adjusted to 2.0 by the addition of about 210 ml/h of 3 molar sulfuric acid. There were developed 28.6 l of nitrous oxide per hour (moist; 20° C. and 1.013 bars). The spent solution was free of nitrite.

EXAMPLE 7

In the same apparatus as in Example 1 there were reacted per hour 320 ml of 7.77 molar $NaNO_2$ solution and 600 ml of 5.13 molar $NaHSO_3$ solution (molar ratio of bisulfite to nitrite of 1.24). The pH value was adjusted to 0.8 by the controlled addition of about 190 ml/h of 3 molar sulfuric acid. The reaction temperature was maintained at +14° C. by cooling the reaction mixture with a cooling liquid produced in a refrigerating thermostat. 19.7 Liters of gas were developed per hour (moist; 20° C. and 1.013 bars). The dry gas showed the following composition: $N_2O$ 90%; NO 2.7%; $CO_2$ 3.1%; $N_2$ 4.9%; $SO_2$ 0.77%. In the reaction mixture, Glauber's salt ($Na_2SO_4.10 H_2O$) separated by crystallization. From time to time a corresponding proportion of the suspension was let off. The supernatant solution still contained about 1 equivalent per liter of reducing substances (hydroxylamine).

EXAMPLE 8

In the same apparatus as in Example 1 there were reacted per hour 400 ml of a 7.77 molar $NaNO_2$ solution and 620 ml of a 5.13 molar $NaHSO_3$ solution (molar ratio of bisulfite to nitrite of 1.02). By heating the vessel jacket with low-pressure steam, a temperature of 98° C. was reached in the reaction vessel. The pH value was adjusted to 1.5 by the controlled addition of about 260 ml/h of 1 molar sulfuric acid. The amount of gas developed per hour was 45.2 l (moist; 35° C. and 1.013 bars). The dry gas has the following composition; $N_2O$ 66%; NO 31%; $CO_2$ 2.1%; $N_2$ 0.22%, $SO_2$ less than 0.1%. In the reaction mixture, anhydrous sodium sulfate separated in a crystalline form. From time to time a corresponding proportion of the suspension was let off. The supernatant solution still contained 0.085 equivalent per liter of reducing substances (hydroxylamine).

EXAMPLE 9

250 ml/h of a 2 molar sodium nitrite solution (prepared by diluting a 40% technical sodium nitrite solution having the composition of from 37 to 41% of $NaNO_2$, 2 to 3% of $NaNO_3$, about 0.5% of $Na_2CO_3$ and about 0.1% of NaOH with water) were added at the top of a jacketed bubble tray column made of glass with an inner diameter of 50 mm and 5 trays, by means of a dosing pump. At the bottom of said column, 11.2 l/h of $SO_2$ were introduced in the normal state. By adjusting the reactants, the reaction zone was maintained at the center tray and the one below the center tray. The reaction heat was carried off by cooling the column jacket with water (water temperature +15° C.). 7.4 Liters per hour of steam-saturated nitrous oxide of 20° C. and 1.013 bars were developed. The dry gas contained 52% of $N_2O$, 46% of NO, 1.4% of $CO_2$ and 1.1% of $N_2$. The spent sodium bisulfate solution of a pH value of 0.3 was saturated with $SO_2$.

EXAMPLE 10

A jacketed stirring vessel of a capacity of 2 liters provided with an overflow was used as reaction vessel. 22.4 Liters of $SO_2$ in the normal state were introduced per hour into the completely reacted sodium bisulfate solution being present. A 2 molar sodium nitrite solution was fed in from a dropping funnel provided with an electrovalve. The redox potential of the solution was measured with a platinum electrode against a saturated calomel electrode, and the electrovalve was controlled in a way that at a potential difference of less than 350 ml the valve was opened. In this manner, about 500 ml of 2 molar sodium nitrite solution were added in doses per hour. The heat of reaction was carried off by jacket cooling with cooling water. The reaction temperature was 20° C. The amount of gas developed per hour was 12.7 l (moist; 20° C. and 1.013 bars). The dry gas had the following composition: 92% of $N_2O$; 5.9% of NO; 0.39% of $N_2$; 0.67% of $SO_2$ and 1.8 of $CO_2$.

EXAMPLE 11

The spent sodium bisulfate solution having a pH value of 0.4 had only a slight smell of $SO_2$. After blowing off the dissolved $SO_2$ with nitrogen, part of the solution was titrated with a 0.1 N $KMnO_4$ solution. The solution contained 0.085 equivalent per liter of reducing substances (hydroxylamine).

EXAMPLE 12

The same reaction vessel as in Example 10 was used, however, the gas developed was led over a jacketed bubble tray column provided with 5 trays and having an inner diameter of 50 mm. In this column the gas was washed in the countercurrent with sodium nitrite solution, whereby it was freed of $SO_2$. The liquid leaving the column was introduced via the controlled electrovalve into the reaction vessel, just like the sodium nitrite solution in Example 2, while the fresh sodium nitrite solution was introduced in the same amount at the top of the column by means of a dosing pump. The reaction vessel and the column were cooled with cooling water. The temperature in the reaction vessel was 20° C. The amounts added in doses per hour were 22.4 l of $SO_2$ in the normal state and 580 ml of 2 molar sodium nitrite solution. At the top of the column, 14.5 l/h of nitrous oxide (moist; 20° C. and 1.013 bars) were withdrawn. The dry gas contained 88% of $N_2O$, 10% of NO, 0.36% of $N_2$ and 2.1% of $CO_2$. After blowing off the $SO_2$, the spent solution was titrated with a 0.1 N $KMnO_4$ solution. It contained 0.054 equivalent per liter of reducing substances (hydroxylamine).

What is claimed is:

1. Process for the preparation of nitrous oxide, which comprises introducing into an aqueous solution having a pH value of from 0 to 3 an inorganic nitrite and an inorganic $SO_2$ source, while applying molar ratios of nitrite to sulfite of from 1:1 to 1:1.5.

2. Process as claimed in claim 1, which comprises working at a temperature in the range of from 0° to 100° C.

3. Process as claimed in claim 1, which comprises using sulfur dioxide as inorganic $SO_2$ source.

4. Process as claimed in claim 1, wherein the gas being formed is purified by washing with aqueous alkali metal hydroxide solution and an alkaline permanganate solution.

5. Process as claimed in claim 1, which comprises controlling the addition of the inorganic nitrite via the redox potential of the aqueous solution.

* * * * *